(12) United States Patent
Hoover-Szendre

(10) Patent No.: US 6,360,950 B1
(45) Date of Patent: Mar. 26, 2002

(54) CIRCUIT BOARD STUFFING PROCESS

(76) Inventor: Melida J. Hoover-Szendre, 10108 Cone Grove Rd., Riverview, FL (US) 33569

( * ) Notice: Subject to any disclaimer, the term of this patent is extended or adjusted under 35 U.S.C. 154(b) by 0 days.

(21) Appl. No.: 09/523,214

(22) Filed: Mar. 10, 2000

(51) Int. Cl.[7] .................................................. G06K 7/10
(52) U.S. Cl. ........................... 235/462.45; 235/462.14; 235/462.15
(58) Field of Search ....................... 235/462.01, 462.14, 235/462.15, 462.45; 29/833, 832, 740

(56) References Cited

U.S. PATENT DOCUMENTS

| | | | | |
|---|---|---|---|---|
| 4,944,095 A | * | 7/1990 | Anglehart | 235/483 |
| 5,231,585 A | * | 7/1993 | Kobayashi et al. | 364/468 |
| 5,432,702 A | * | 7/1995 | Barnett | 235/375 |
| 5,438,751 A | | 8/1995 | Miyazaki et al. | 29/847 |
| 5,501,003 A | | 3/1996 | Bernstein | 29/827 |
| 5,529,950 A | | 6/1996 | Hoenleen et al. | 437/170 |
| 5,557,508 A | | 9/1996 | Sato et al. | 361/818 |
| 5,588,205 A | | 12/1996 | Roane | 29/830 |
| 5,635,700 A | * | 6/1997 | Fazekas | 235/472 |
| 5,657,537 A | | 8/1997 | Saia et al. | 29/830 |
| 6,059,121 A | * | 5/2000 | Hirose | 209/559 |
| 6,085,018 A | * | 7/2000 | Maeda et al. | 386/46 |
| 6,195,618 B1 | * | 2/2001 | Rosenberg et al. | 702/152 |

FOREIGN PATENT DOCUMENTS

| | | | |
|---|---|---|---|
| JP | 40918602 | * | 4/1997 |
| JP | 409270598 | * | 10/1997 |

* cited by examiner

*Primary Examiner*—Michael G. Lee
*Assistant Examiner*—Seung Ho Lee
(74) *Attorney, Agent, or Firm*—Joseph N. Breaux

(57) ABSTRACT

A circuit board stuffing process that includes providing a circuit board having bar codes positioned adjacent to component insertion locations and a trigger actuated bar code reader in connection with a computer system and wherein the assembly technician scans in the bar code for a particular component insertion location and the computer system displays information about the electronic component to be inserted including the part number and the storage location from which the electronic component should be retrieved.

2 Claims, 4 Drawing Sheets

CIRCUIT BOARD STUFFING PROCESS

TECHNICAL FIELD

The present invention relates to electronic assembly techniques and more particularly to a circuit board stuffing process that includes the steps of: a) providing a circuit board having a forming number of component lead insertion locations, each of the number of component insertion locations being identified by a barcode positioned adjacent to the component lead insertion holes forming an identified component insertion location; b) providing an assembly drawing having a number of component lead insertion holes identified thereon that form a number of component insertion locations, each of the number of component insertion locations being identified by a barcode printed adjacent to the component lead insertion holes forming an identified component insertion location; c) providing a trigger actuated bar code reader having an actuating trigger, a barcode verifying laser aimed at a same location as a barcode reading laser of a barcode reading circuit and a magnifying glass having cross hairs provided thereon for visually verifying the barcode to be read by the barcode reading circuit; d) providing a computer system having a visual output device, the computer system being interfaced with the trigger actuated bar code reader and having a database programmed into memory including bar code information keyed to specific electronic component part numbers, part descriptions and part storage locations, the computer system being programmed to compare a scanned in bar code to the number of preprogrammed bar codes and output information related to the electronic component corresponding to the scanned in bar code including the part number, the part description and the part storage location from which to retrieve the electronic component; e) aiming the barcode verifying laser of the trigger actuated bar code reader at a bar code to be read and scanning in the bar code to be read by squeezing the actuation trigger; f) retrieving an electronic component from the part location identified by the computer system; g) inserting the leads of the electronic component into the component lead insertion holes forming the component insertion location corresponding to the scanned in bar code; and h) repeating steps e,f and g until an electronic component has been inserted into each of the number of component insertion locations.

BACKGROUND ART

Building prototype circuit boards and small runs of hand stuffed circuit boards requires absolute accuracy in the proper selection and insertion of electronic components into the proper component insertion locations of the circuit board. To help the assembly technicians achieve this degree of accuracy, it would be a benefit to have a circuit board stuffing process that included providing a circuit board having bar codes positioned adjacent to component insertion locations and a trigger actuated bar code reader in connection with a computer system wherein the assembly technician scans in the bar code for a particular component insertion location and the computer system displays information about the electronic component to be inserted including the part number and the storage location from which the electronic component should be retrieved.

GENERAL SUMMARY DISCUSSION OF INVENTION

It is thus an object of the invention to provide a circuit board stuffing process that includes the steps of: a) providing a circuit board having a number of component lead insertion holes drilled therethrough forming a number of component insertion locations, each of the number of component insertion locations being identified by a barcode positioned adjacent to the component lead insertion holes forming an identified component insertion location; b) providing a trigger actuated bar code reader having an actuating trigger, a barcode verifying laser aimed at a same location as a barcode reading laser of a barcode reading circuit and a magnifying glass having cross hairs provided thereon for visually verifying the barcode to be read by the barcode reading circuit; c) providing a computer system having a visual output device, the computer system being interfaced with the trigger actuated bar code reader and having a database programmed into memory including bar code information keyed to specific electronic component part numbers, part descriptions and part storage locations, the computer system being programmed to compare a scanned in bar code to the number of preprogrammed bar codes and output information related to the electronic component corresponding to the scanned in bar code including the part number, the part description and the part storage location from which to retrieve the electronic component; d) aiming the barcode verifying laser of the trigger actuated bar code reader at a bar code to be read and scanning in the bar code to be read by squeezing the actuation trigger; e) retrieving an electronic component from the part location identified by the computer system; f) inserting the leads of the electronic component into the component lead insertion holes forming the component insertion location corresponding to the scanned in bar code; and g) repeating steps d,e, and f until an electronic component has been inserted into each of the number of component insertion locations.

Accordingly, a circuit board stuffing process is provided. The circuit board stuffing process includes the steps of: a) providing a circuit board having a number of component lead insertion holes drilled therethrough forming a number of component insertion locations, each of the number of component insertion locations being identified by a barcode positioned adjacent to the component lead insertion holes forming an identified component insertion location; b) providing a trigger actuated bar code reader having an actuating trigger, a barcode verifying laser aimed at a same location as a barcode reading laser of a barcode reading circuit and a magnifying glass having cross hairs provided thereon for visually verifying the barcode to be read by the barcode reading circuit; c) providing a computer system having a visual output device, the computer system being interfaced with the trigger actuated bar code reader and having a database programmed into memory including bar code information keyed to specific electronic component part numbers, part descriptions and part storage locations, the computer system being programmed to compare a scanned in bar code to the number of preprogrammed bar codes and output information related to the electronic component corresponding to the scanned in bar code including the part number, the part description and the part storage location from which to retrieve the electronic component; d) aiming the barcode verifying laser of the trigger actuated bar code reader at a bar code to be read and scanning in the bar code to be read by squeezing the actuation trigger; e) retrieving an electronic component from the part location identified by the computer system; f) inserting the leads of the electronic component into the component lead insertion holes forming the component insertion location corresponding to the scanned in bar code; and g) repeating steps d,e, and f until an electronic component has been inserted into each of the number of component insertion locations.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
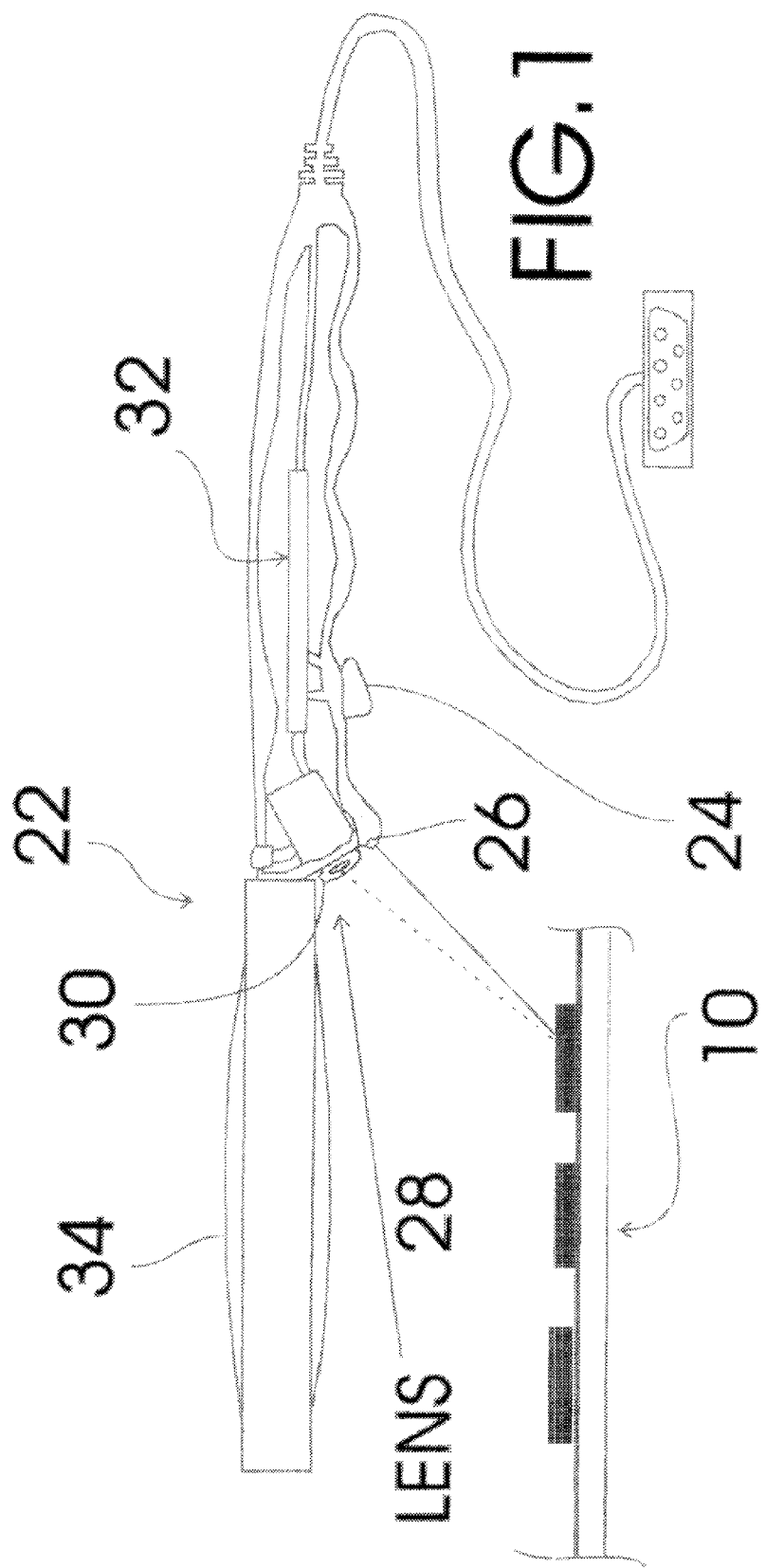
FIG. 1 is a partial cutaway side plan view of an exemplary embodiment of the trigger actuated bar code reader used in the circuit board stuffing process of the present invention showing the actuating trigger, the barcode verifying laser, the magnifying lens and the bar code reading circuit including the bar code reading laser.
Figure 2:
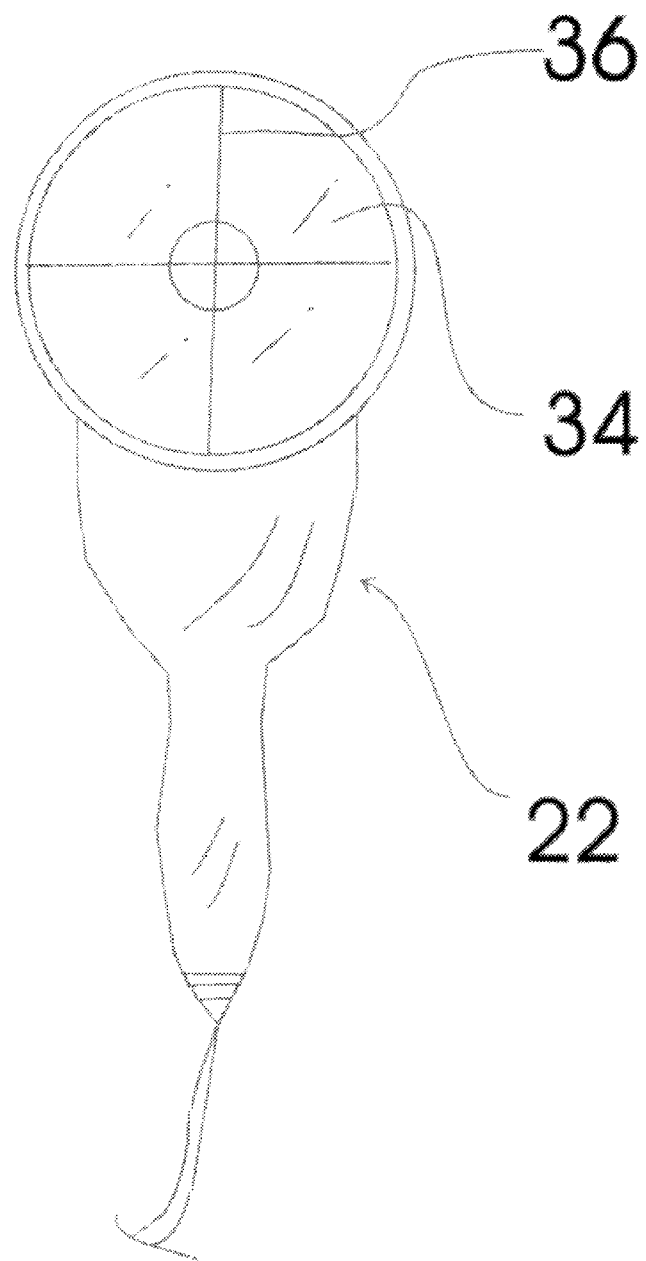
FIG. 2 is a top pan view of the trigger actuated bar code reader used in the circuit board stuffing process of the present invention showing the cross hairs formed on the magnifying lens.
Figure 3:
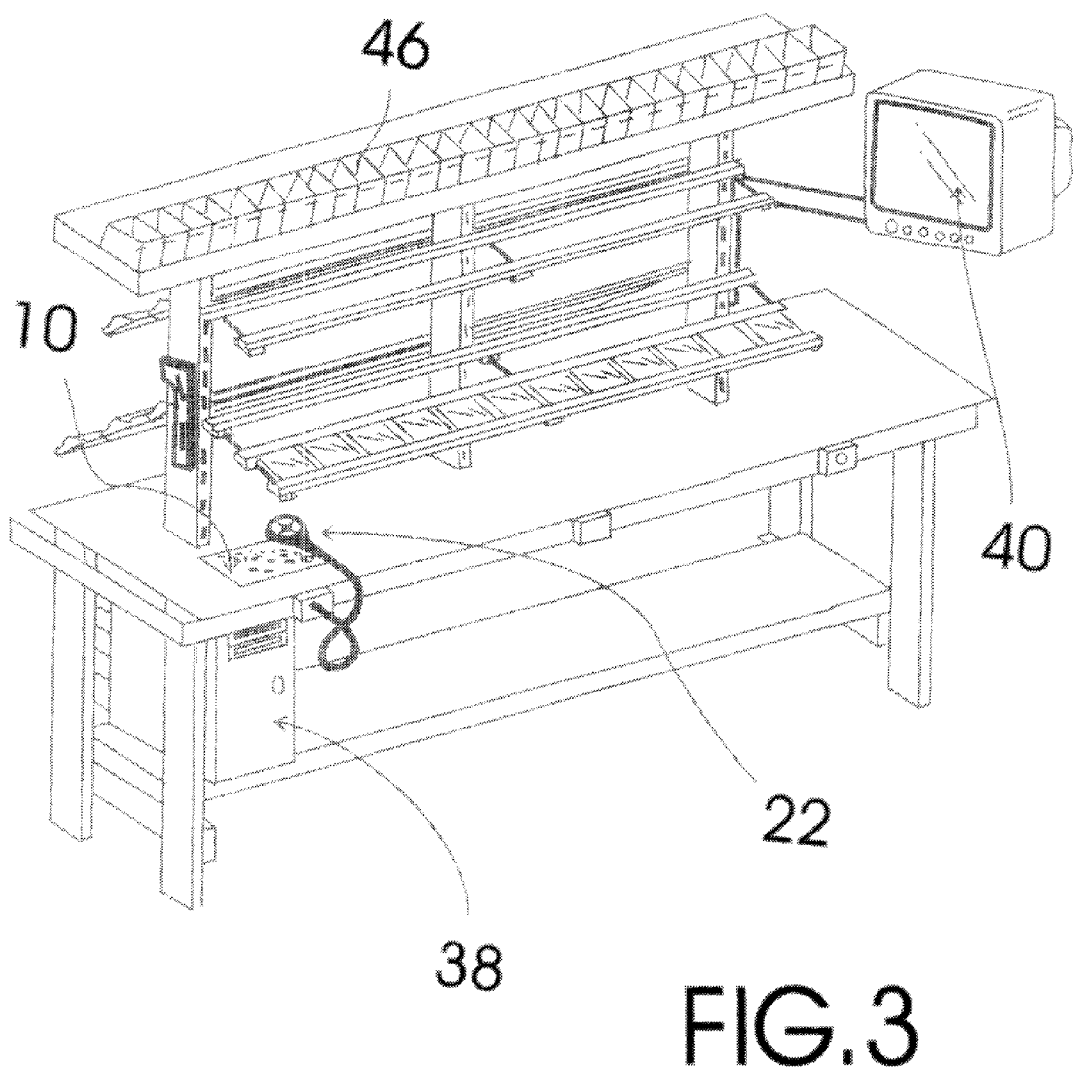
FIG. 3 is a perspective view of an exemplary workstation used in practicing the circuit board stuffing process of the present invention showing a work table having a table surface, a number of circuit board holding fixtures, a number of electronic component storage bins having identifying information of the front surface thereof corresponding to the electronic component storage location information stored in the computer system, a computer system including a computer monitor, and a trigger actuated bar code reader.
Figure 4:
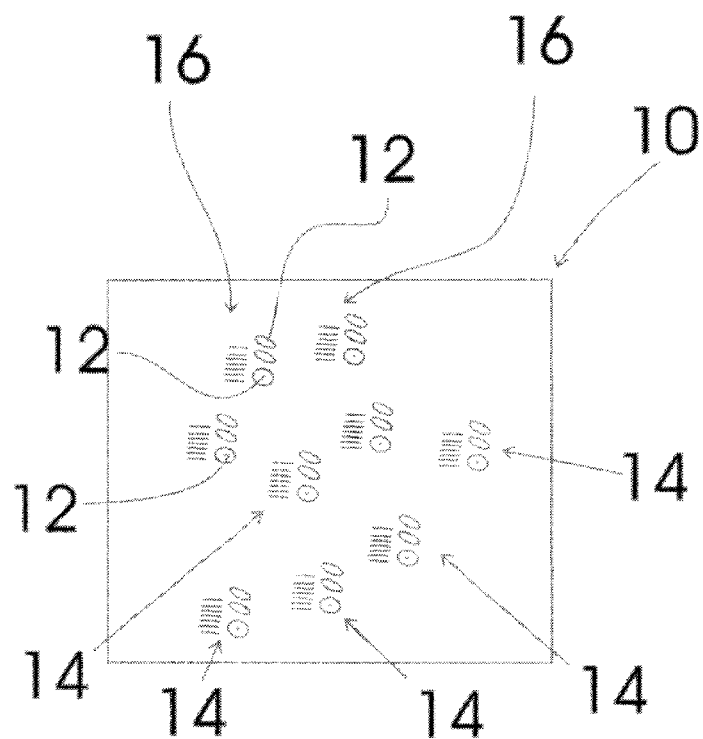
FIG. 4 is a top plan view showing an exemplary embodiment of the circuit board provided in the circuit board stuffing process of the present invention showing a number of the component insertion locations each having a barcode positioned adjacent thereto.
Figure 5:
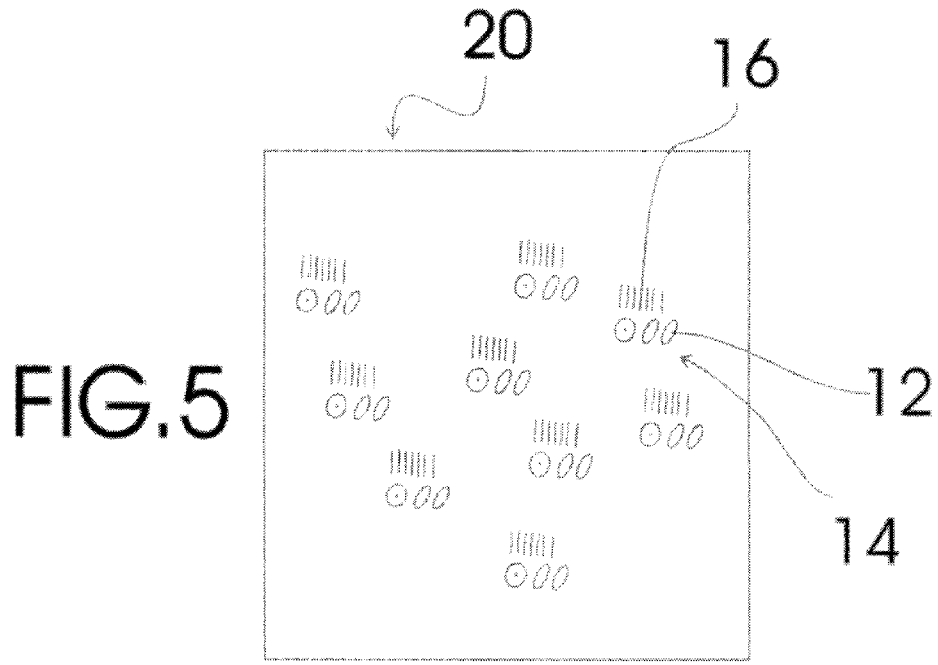
FIG. 5 is a top plan view showing an exemplary embodiment of the assembly drawing provided in the circuit board stuffing process of the present invention showing a number of the component insertion locations each having a barcode positioned adjacent thereto.

FIGS. 1–5 show various aspects of the devices used in an exemplary embodiment of the circuit board stuffing process of the present invention. The exemplary circuit board stuffing process includes the steps of: a) providing a circuit board, generally designated 10, having a number of component lead insertion holes 12 drilled therethrough forming a number of component insertion locations, generally designated 14, each of the number of component insertion locations being identified by a bar code 16 positioned adjacent to the component lead insertion holes 12 forming an identified component insertion location 14; b) providing an assembly drawing 20 having a number of component lead insertion holes 12 identified thereon that form a number of component insertion locations 14, each of the number of component insertion locations 14 being identified by a barcode 16 printed adjacent to the component lead insertion holes 12 forming an identified component insertion location 14; c) providing a trigger actuated bar code reader, generally designated 22 having an actuating trigger 24, a barcode verifying laser 26 aimed at a same location 28 as a barcode reading laser 30 of a barcode reading circuit 32 and a magnifying glass 34 having cross hairs 36 provided thereon for visually verifying the barcode 16 to be read by the barcode reading circuit 32; d) providing a computer system 38 having a computer monitor visual output device 40, the computer system 38 being interfaced with trigger actuated bar code reader 22 and having a database programmed into memory including bar code information keyed to specific electronic component part numbers, part descriptions and part storage locations for the circuit board to be stuffed, the computer system 38 being programmed to compare a scanned in bar code to the number of preprogrammed bar codes and output information related to the electronic component corresponding to the scanned in bar code including the part number, the part description and the part storage in the numbered storage bins 46 from which to retrieve the electronic component; e) aiming the barcode verifying laser 30 of trigger actuated bar code reader 22 at a bar code to be read and scanning in the bar code to be read by squeezing the actuation trigger 24; f) retrieving an electronic component from the numbered part storage bin 46 identified by the computer system; g) inserting the leads of the electronic component into the component lead insertion holes 12 forming the component insertion location 14 corresponding to the scanned in bar code; and h) repeating steps e,f and g until an electronic component has been inserted into each of the number of component insertion locations 14.

It can be seen from the preceding description that a circuit board stuffing process has been provided.

It is noted that the embodiment of the circuit board stuffing process described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A circuit board stuffing process comprising the steps of:
   a) providing a circuit board having a number of component lead insertion holes drilled therethrough forming a number of component insertion locations, each of the number of component insertion locations being identified by a barcode positioned adjacent to the component lead insertion holes forming an identified component insertion location;
   b) providing a trigger actuated bar code reader having an actuating trigger, a barcode verifying laser aimed at a same location as a barcode reading laser of a barcode reading circuit and a magnifying glass having cross hairs provided thereon for visually verifying the barcode to be read by the barcode reading circuit;
   c) providing a computer system having a visual output device, the computer system being interfaced with the trigger actuated bar code reader and having a database programmed into memory including bar code information keyed to specific electronic component part numbers, part descriptions and part storage locations, the computer system being programmed to compare a scanned in bar code to the number of preprogrammed bar codes and output information related to the electronic component corresponding to the scanned in bar code including the part number, the part description and the part storage location from which to retrieve the electronic component;
   d) aiming the barcode verifying laser of the trigger actuated bar code reader at a bar code to be read and scanning in the bar code to be read by squeezing the actuation trigger;
   e) retrieving an electronic component from the part location identified by the computer system;

f) inserting the leads of the electronic component into the component lead insertion holes forming the component insertion location corresponding to the scanned in bar code; and g) repeating steps d,e, and f until an electronic component has been inserted into each of the number of component insertion locations.

2. A circuit board stuffing process comprising the steps of:

a) providing a circuit board having a number of component lead insertion holes drilled therethrough forming a number of component insertion locations, each of the number of component insertion locations being identified by a barcode positioned adjacent to the component lead insertion holes forming an identified component insertion location;

b) providing an assembly drawing having a number of component lead insertion holes identified thereon that form a number of component insertion locations, each of the number of component insertion locations being identified by a barcode printed adjacent to the component lead insertion holes forming an identified component insertion location;

c) providing a trigger actuated bar code reader having an actuating trigger, a barcode verifying laser aimed at a same location as a barcode reading laser of a barcode reading circuit and a magnifying glass having cross hairs provided thereon for visually verifying the barcode to be read by the barcode reading circuit;

d) providing a computer system having a visual output device, the computer system being interfaced with the trigger actuated bar code reader and having a database programmed into memory including bar code information keyed to specific electronic component part numbers, part descriptions and part storage locations, the computer system being programmed to compare a scanned in bar code to the number of preprogrammed bar codes and output information related to the electronic component corresponding to the scanned in bar code including the part number, the part description and the part storage location from which to retrieve the electronic component;

e) aiming the barcode verifying laser of the trigger actuated bar code reader at a bar code to be read and scanning in the bar code to be read by squeezing the actuation trigger;

f) retrieving an electronic component from the part location identified by the computer system;

g) inserting the leads of the electronic component into the component lead insertion holes forming the component insertion location corresponding to the scanned in bar code; and h) repeating steps e,f and g until an electronic component has been inserted into each of the number of component insertion locations.

\* \* \* \* \*